US005597635A

United States Patent [19]

Pusl et al.

[11] Patent Number: 5,597,635

[45] Date of Patent: Jan. 28, 1997

[54] BUSINESS FORM WITH ADHESIVE FOR WINDOW MOUNTING

[75] Inventors: Kenneth E. Pusl, Valencia; C. Vincent Sisilli, Oxnard, both of Calif.

[73] Assignee: The Reynolds and Reynolds Company, Dayton, Ohio

[21] Appl. No.: 283,299

[22] Filed: Jul. 29, 1994

[51] Int. Cl.[6] .................... B32B 7/12; B32B 3/08; B32B 3/02

[52] U.S. Cl. .................... 428/42.2; 428/43; 428/194; 283/81

[58] Field of Search .................... 428/40, 41, 43, 428/131, 137, 194, 42.2; 462/55, 2, 3; 283/81, 60.1, 94, 101, 103

[56] References Cited

U.S. PATENT DOCUMENTS

| | | | |
|---|---|---|---|
| 2,975,091 | 3/1961 | Tobey | 428/41 |
| 4,864,755 | 9/1989 | Owens | 40/594 |
| 5,200,242 | 4/1993 | Hohmann | 428/40 |
| 5,290,067 | 3/1994 | Langen | 283/60.1 |
| 5,318,325 | 6/1994 | Ipsen | 283/81 |
| 5,318,825 | 6/1994 | Naber | 428/192 |

*Primary Examiner*—Alexander Thomas
*Attorney, Agent, or Firm*—Popham, Haik, Schnobrich & Kaufman, Ltd.

[57] ABSTRACT

A business form with adhesive for window mounting comprises a back sheet and a front sheet. The top edge of the top sheet is coextensive with the top edge of the bottom sheet, but the bottom edge of the top sheet is inwardly offset from the bottom edge of the bottom sheet. A line of adhesive is provided to adhere the back surface of the top sheet to the front surface of the back sheet. The adhesive surfaces of first and second adhesive strips overlap the top and bottom edges, respectively, of the back sheet to define respective top and bottom adhesive areas extending outwardly of the top and bottom edges of the back sheet. First and second releasable liner strips are substantially coextensive with and adhesively attached to the top and bottom adhesive areas, respectively, at the adhesive surfaces. Both sheets have a line of tractor feed holes positioned below the first adhesive strip. The top sheet has a line of weakness parallel to and downwardly offset from the line of adhesive and the line of tractor feed holes, to allow separation of the top sheet from the bottom sheet. Additional top sheets can be used, and are similar to the top sheet which is adhered to the back sheet. Alternatively, the back sheet can be used alone, without any top sheets.

8 Claims, 2 Drawing Sheets

BUSINESS FORM WITH ADHESIVE FOR WINDOW MOUNTING

BACKGROUND OF THE INVENTION

1. Field of the Invention

The present invention relates to business forms with adhesive for mounting on a window, e.g. the window of a vehicle. More specifically, the invention relates to a multipart business form having an adhesive attachment system which permits removal of the top parts and mounting of the remaining part.

2. Related Art

In certain applications, it is required, or at least desirable, to attach a business form to the inside of a motor vehicle window while the vehicle is offered for sale, or to temporarily establish that the recently purchased vehicle has been appropriately registered. A commonly used technique is to fix the form to the glass with transparent adhesive tape at the perimeter of the form by overlapping contact with the back side of the form and the inside of the window at the form's edges. This technique is time consuming, cumbersome, and while all four edges of the form can effectively be protected, the typical results can be unattractive and subject to flaws that will become caught in a window lowering mechanism.

An alternate mounting system uses double sided adhesive tape fixed across the front of the form at its top and bottom. The form is mounted to the window by removing the tape's releasable protective liner, positioning the form with the exposed adhesive against the glass, and pressing on the back of the form along the areas of attachment. A variation of this system replaces the pressure sensitive adhesive tape with water activated gum adhesive. Attachment to the window at the front of a multipart form does not address retention at the bottom of the back part of the form on sloped or curved windows, nor does it protect any of the edges from entanglement.

U.S. Pat. No. 4,864,755 to Owens discloses another system known in the prior art. It is comprised of a form and a transparent backing sheet secured to the back of the form by a permanent pressure sensitive adhesive. The backing sheet releasably secures a marginal liner that extends beyond the entire periphery of the form. The form is attached to the window by removing the marginal liner, positioning the form against the glass, and applying pressure to the exposed perimeter adhesive on the backing sheet.

Owens' transparent backing sheet protects the form, but is replete with limitations. The transparent backing sheet covers the entire back of the business form, eliminating the possibility of making any handwritten entries; and it is discarded when removed from the window, requiring an additional sheet that is ultimately wasted. The system is inflexible in that it requires the center portion be cut to the exact dimensions of the business form, necessitating a different version for each size form, and a precise alignment of the form in the center portion. Owens illustrates a hand cutting operation, alluding to automated solutions for fabrication, but ignores the issue of labor intensive assembly of the form to the mounting system. Those versed in the art will easily recognize the extraordinary capital and operating expense involved in kiss cutting the center portion of the cover sheet, removing that cover sheet to be discarded as waste, and then accurately placing the business form in that center portion. All these operations must be completed by a manufacturer to enable the form to be sold to the user in quantity.

Owens further describes a corner thumb-hold portion that is used to assist in the assembly and mounting, and is left in place for removal of the form. The portion is said to be sufficiently small as not to interfere with window operation, but in practical application it is impossible to predict a size or location that will not foul in some window opening mechanisms. A 2.0 mil sheet of polyester is cited as a suitable backing sheet, and while thickness is not typically an issue, even an adequate 1.0 mil stock will produce a pucker at the corners where the backing gathers to accommodate the level change from the back of the form to the surface of the glass. The condition is proportionately aggravated by an increase in form thickness.

Recognizing many of the drawbacks inherent in Owens' system, U.S. Pat. No. 5,318,325 to Ipsen proposes an improved adhesive form assembly. Ipsen discloses a form assembly including a two-sided form, alone or in combination with a liner sheet having a chemical coating applied between the liner sheet and the two-sided form for the purpose of making duplicates (as shown in FIG. 4). An adhesive attachment strip surrounds the two-sided form, and a liner strip is removably attached to the attachment strip to expose one side of the form. The liner strip is removed to expose the adhesive surface of the attachment strip and the form is mounted on a surface by placing the adhesive surface of the attachment strip against the surface. The form is removably attached to the attachment strip by a line of weakness such as a perforation.

Although Ipsen addresses many of Owens' drawbacks, Ipsen's form is also very complicated to assemble, due to its numerous parts.

A simpler window label is disclosed in U.S. Pat. No. 5,290,067 to Langen. Langen's label comprises a window sticker having a sheet of printable material with first and second faces, and opposite first and second edges parallel to the direction in which the form is elongated. Repositionable adhesive strips are disposed on the first face of the printed material adjacent the first and second edges. Covering release strips are applied to the first face of the printable material over the adhesive strips. Tractor feed openings are provided adjacent the edges and outside of the adhesive strips with lines of weakness, such as perforations, being provided at spaced locations along the printed material perpendicular to the direction in which the form is elongated. Although Langen's label is simple to construct, the positioning of the adhesive strip inwardly of the tractor feed opening makes it difficult to accommodate multiple pages.

It is to the solution of these and other problems that the present invention is directed.

SUMMARY OF THE INVENTION

It is therefore a primary object of the present invention to provide a business form with adhesive for window mounting which is simple to manufacture and use.

It is another object of the present invention to provide a business form with adhesive for window mounting which minimizes the materials of construction, particularly those ultimately discarded, and maximizes the use of those materials.

It is still another object of the present invention to provide a business form with adhesive for window mounting which permits handwritten entries to be made either before or after mounting to the window.

It is still another object of the present invention to provide a business form with adhesive for window mounting which permits repositioning after mounting.

It is still another object of the present invention to provide a business form with adhesive for window mounting which includes top sheets which are removable prior to mounting of the bottom sheet on the window.

It is still another object of the present invention to provide a business form with adhesive for window mounting which permits easy removal after mounting, so that the form can be retained for archival purposes.

These and other objects are achieved by providing a business form with adhesive for window mounting comprising a back sheet and a front sheet. The back sheet has opposed top and bottom edges, opposed side edges, a front surface, and a back surface, and a line of tractor feed holes inwardly offset from the top edge. The form can be selectively adhered to a surface by first and second adhesive strips having an adhesive surface and a non-adhesive surface. The adhesive surface of the first adhesive strip overlaps the top edge of the back sheet to define a top adhesive area extending outwardly of the top edge of the back sheet, and the adhesive surface of the second adhesive strip overlaps the bottom edge of the back sheet to define a bottom adhesive area extending outwardly of the bottom edge of the back sheet. The first adhesive strip is positioned above the tractor feed holes in the bottom sheet.

First and second releasable liner strips are substantially coextensive with and adhesively attached to the top and bottom adhesive areas, respectively, at the adhesive surfaces, to protect the adhesive surfaces until the form is to be mounted.

The top sheet has opposed top and bottom edges, opposed side edges, a front surface, and a back surface. It is substantially coextensive with the back sheet, the top edge of the top sheet being coextensive with the top edge of the bottom sheet, but the bottom edge of the top sheet being inwardly offset from the bottom edge of the bottom sheet to allow additional information to be printed on the bottom sheet which is visible from the front. The back surface of the top sheet faces the front surface of the back sheet.

According to one aspect of the invention, a line of adhesive is provided to adhere the back surface of the top sheet to the front surface of the back sheet. The line of adhesive is parallel to and inwardly offset from the top edges of the top and back sheets.

According to another aspect of the invention, a line of weakness is provided parallel to and downwardly offset from the line of adhesive, to allow separation of the top sheet from the bottom sheet.

According to still another aspect of the invention, the top sheet further includes a line of tractor feed holes aligned with the line of tractor feed holes in the back sheet, as a means of feeding of the form through processing equipment.

Additional top sheets can be used, and are similar to the top sheet which is adhered to the back sheet. Alternatively, the back sheet can be used alone, without any top sheets.

In an alternate embodiment, the tractor feed holes can be eliminated, where the form is assembled by friction with the web.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 2:
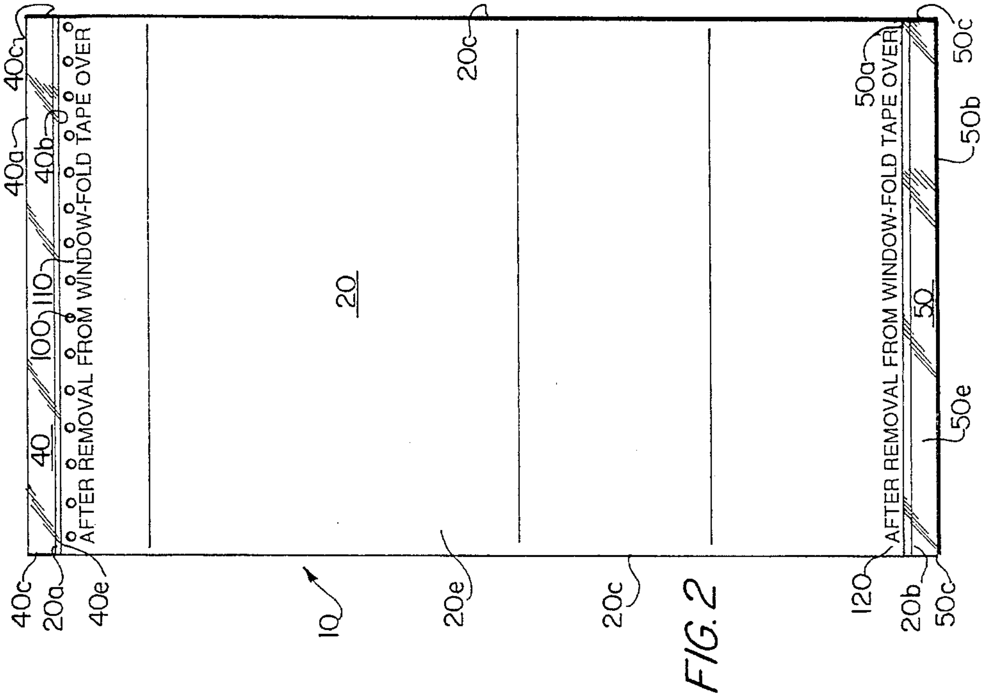
FIG. 2 is a back surface elevational view of the business form of FIG. 1.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 5:
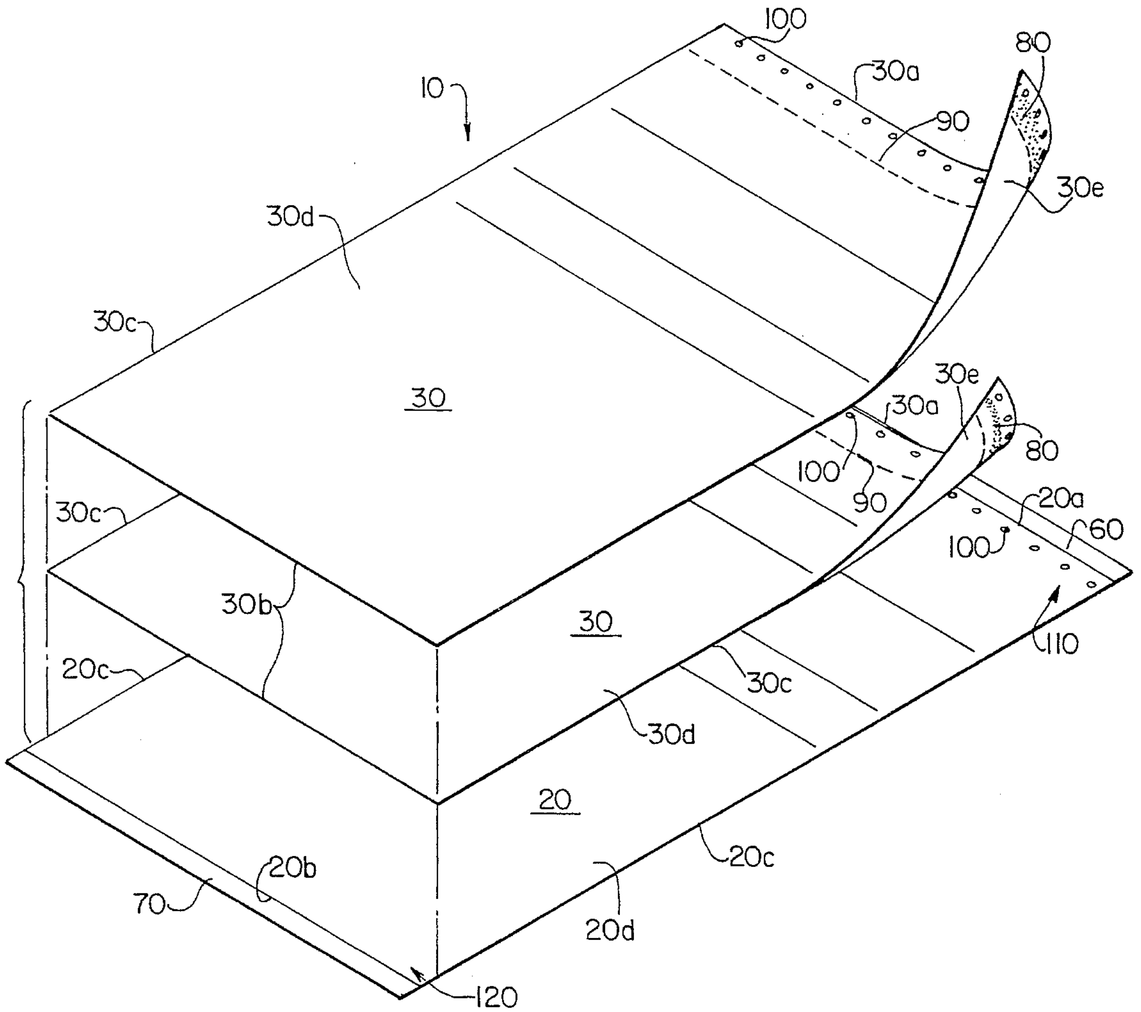
FIG. 5 is an exploded view of the business form of FIG. 1.

Referring now to FIGS. 1, 2, 4, and 5, there is shown a first embodiment of a business form 10 with adhesive for window mounting in accordance with the invention. Business form 10 comprises a bottom sheet 20 and, preferably, one or more top sheets 30. As shown in FIG. 5, business form 10 includes two top sheets 30. However, more or fewer top sheets 30 can be used, as will be described in greater detail hereinafter, or bottom sheet 20 can be used alone.

Bottom sheet 20 includes opposed top and bottom edges **20*a* and 20*b*, opposed side edges 20*c*, a front surface 20*d*, and a back surface 20*e*. Likewise, each top sheet 30 includes opposed top and bottom edges 30*a* and 30*b*, opposed side edges 30*c*, a front surface 30*d*, and a back surface 30*e***.

Business form 10 is adhered to a vehicle window or any other transparent surface by first and second adhesive strips 40 and 50. First adhesive strip 40 includes opposed top and bottom edges **40*a* and 40*b*, opposed side edges 40*c*, an adhesive front surface 40*d*, and a non-adhesive back surface 40*e*. Likewise, second adhesive strip 50 includes opposed top and bottom edges 50*a* and 50*b*, opposed side edges 50*c*, an adhesive front surface 50*d*, and a non-adhesive back surface 50*e*. Preferably, the adhesive properties of front surfaces 40*d* and 50*d* enable it to adhere substantially permanently to back surface 20*e* yet to be removable from a surface such as a window without undue difficulty. Also, the adhesive should be resistant to ultra-violet rays, and preferably, but not necessarily, transparent. Its thickness should be held to a minimum to reduce the chances of fouling and in the interest of economy. A preferred tap adhesive system for use as strips 40 and 50** is Film Tape No. 8411 manufactured by 3M of St. Paul, Minn.

Adhesive front surfaces **40*d* and 50*d* of first and second adhesive strips 40 and 50 contact back surface 20*e* of back sheet 20. First adhesive trip 40 overlaps top edge 20*a* of back sheet 20 to define a top adhesive area 40*f* extending outwardly of top edge 20*a*, while second adhesive strip 50 overlaps bottom edge 20*b* to define a bottom adhesive area 50*f* extending outwardly of bottom edge 20*b*. As will be appreciated from FIG. 2, bottom edge 40*b* of first adhesive strip 40 thus is positioned below (i.e., inwardly of) top edge 20*a* of back sheet 20, and top edge 40*a* is positioned above (i.e., outwardly of) top edge 20*a*. Likewise, top edge 50*a* of second adhesive strip 50 is positioned above (i.e., inwardly of) bottom edge 20***b* of back sheet 20, and bottom edge 50*b* is positioned below (i.e., outwardly of) bottom edge 50*b*.

In order to prevent back sheet 20 from adhering to undesired surfaces to contact with top and bottom adhesive areas 40*f* and 50*f*, first and second releasable liner strips 60 and 70 are substantially coextensive with and adhesively attached to top and bottom adhesive areas 40*f* and 50*f* at their adhesive front surfaces 40*d* and 50*d*.

Each top sheet 30 has its top edge 30*a* aligned with the top edge of back sheet 20 and is at least substantially coextensive with back sheet 20, being placed over back sheet 20 with its back surface 30*e* facing front surface 20*d* of back sheet 20. Top sheets 30 need not be entirely coextensive with back sheet 30 in that their bottom edges 30*b* can be inwardly offset from the bottom edge of bottom sheet 20*b*, for a purpose to be described hereinafter. The back surfaces 30*e* of top sheets 30 and the facing front surfaces 30*d* and 20*d* of top sheets 30 and back sheet 20 can be coated in accordance with known methods to enable the "carbonless" entry of duplicate data on successive sheets. Alternatively, intermediate top sheets 30 can be carbon paper.

Aligned lines of adhesive 80 adhere the various sheets together, back surface to front surface. Lines of adhesive 80 are parallel to and inwardly offset from top edges 20*a* and 30*a* of back sheet 20 and front sheets 30.

Top sheets 30 also include aligned lines of weakness 90, such as perforations, which enable them to be separated from back sheet 20 prior to mounting of back sheet 20 to a window or other surface or after removal of complete form 10 from the window or other surface. Lines of weakness 90 are positioned parallel to and inwardly offset from top edges 20*a* and 30*a* of back and front sheets 20 and 30, and parallel to and inwardly offset from lines of adhesive 80. Thus, front sheets 30 can be separated from back sheet 20 at lines of weakness 90 without affecting first adhesive strip 40.

Figure 3:
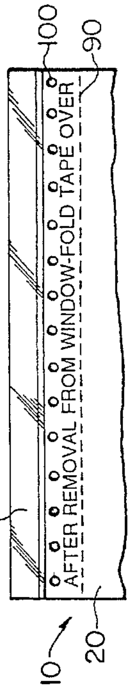
FIG. 3 is a back surface elevational view of the top of an alternate embodiment of a business form with adhesive for window mounting in accordance with the present invention.
Figure 1:
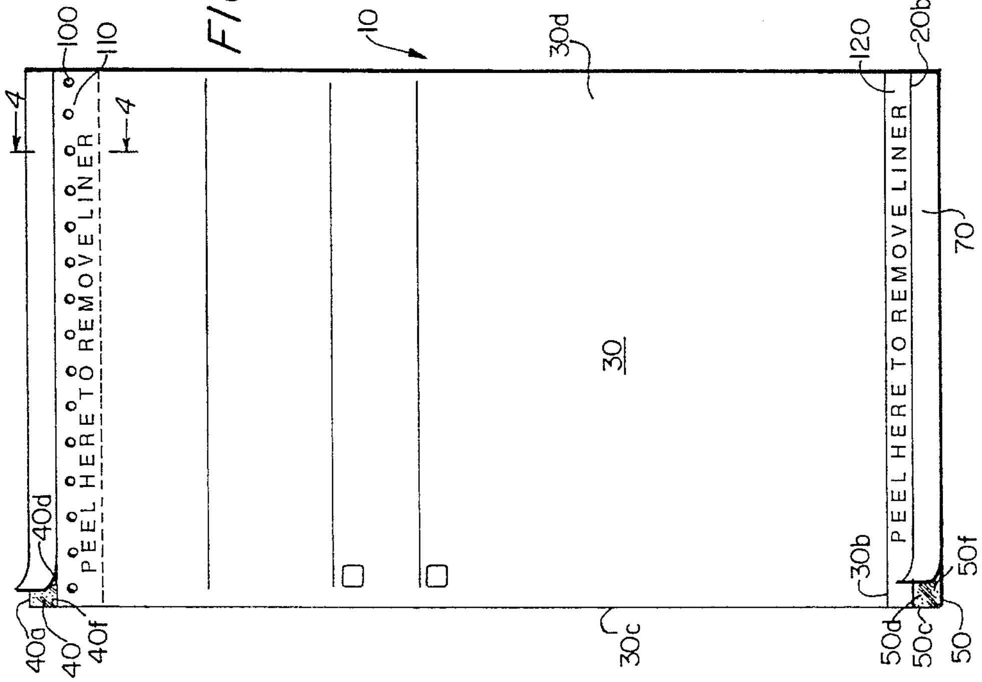
FIG. 1 is a front surface elevational view of a business form with adhesive for window mounting in accordance with the present invention.
Figure 4:
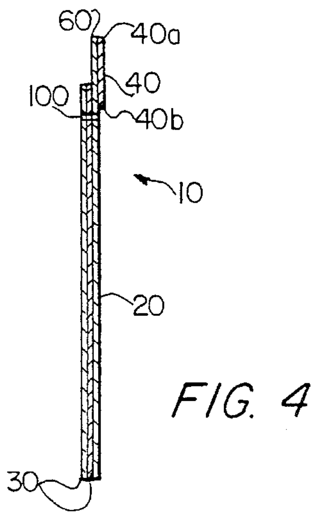
FIG. 4 is a cross-sectional view of the top of the business form of FIG. 1.

In a second embodiment of the invention, illustrated in FIG. 3, back sheet 20 can also include a line of weakness 90, which enables it to be separated from first adhesive strip 40 when it is desired to remove back sheet 20 permanently from the window or other surface. However, inclusion of a line of weakness 90 in back sheet 20 decreases the structural integrity of back sheet 20, increasing the likelihood of unwanted separation.

In order to facilitate assembly of form 10, aligned lines of tractor feed holes 100 can be provided in back and front sheets 20 and 30. Lines of tractor feed holes 100 are positioned parallel to top edges 20*a* and 30*a* of back and front sheets 20 and 30 and intermediate lines of weakness 90 and the bottom edge 40*b* of top adhesive strip 40. However, tractor feed holes 100 need not be provided where friction, for example, is used in the assembly process as described hereinafter.

Top and bottom sheets 20 and 30 are assembled using conventional production techniques for assembling multipart business forms printed on continuous webs or rolls. Each sheet is formed from a web, the side edges of the webs becoming the top and bottom edges of sheets 20 and 30. The webs are transported by a collator using tractor or friction feed. As will be appreciated by those of skill in the art, this production technique easily accommodates the addition of rolls of adhesive strip and release liner to the transport mechanism for attachment and cutoff with individual forms 10. In an alternate embodiment, the adhesive strip and release liner are applied to a single part form (i.e., a form 10 employing only the back sheet 20), using the same technique on the printing press.

Whether form 10 is multi-part or single part, those skilled in the art will further appreciate that the adhesive strip and release line are assembled to the web without any additional machine time at the speed of collation or printing (hundreds of feet per minute) with only minimal set-up labor required.

In use, any desired information is manually entered to form 10 prior to mounting. Top sheets 30 can be separated prior to mounting, or can be left in place. Due to the unique positioning of first and second adhesive areas 40*f* and 50*f* relative to top and bottom edges 30*a* and 30*b* of top sheets 30, top sheets 30 can be left in place without affecting the ability to mount form 10 and readjust its position.

When form 10 is ready for mounting, first and second release liner strips 60 and 70 are manually peeled away from top and bottom adhesive areas 40*f* and 50*f*, exposing top and bottom adhesive areas 40*f* and 50*f*. Form 10 can then be positioned as desired on the window or other surface, and adhered in place applying pressure against adhesive areas 40*f* and 50*f*. Form 10 can be removed from the window by using the most accessible unattached side to begin release of the adhesive area in closest proximity. With one of adhesive areas 40*f* or 50*f* removed in this fashion, the opposite adhesive area is easily detached by pulling on form 10 obliquely to the mounting surface. Form 10 can then be repositioned, thrown out, or retained as desired.

If it is desired to retain form 10, adhesive areas 40*f* and 50*f* can be "de-activated" by folding them over to front surface 30*d* at the top and to front surface 20*d* at the bottom. At the top, the area above lines of weakness 90 provides a top margin 110 for disposal of adhesive area 40*f*, whether or not any or all of front sheets 30 have been removed. At the bottom, the area between bottom edges 30*b* of top sheets 30 and bottom edge 20*b* of bottom sheet 20 provides a bottom margin for disposal of adhesive area 50*f*, whether or not any or all of front sheets 30 have been removed. These top and bottom margins can be provided with printed instructions. For example, on the front, the marginal instructions can read "PEEL HERE TO REMOVE LINE," and on the back, the marginal instructions can read "AFTER REMOVAL FROM WINDOW—FOLD TAPE OVER."

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A business form for window mounting comprising:

a back sheet having opposed top and bottom edges, opposed side edges, a front surface, and a back surface;

first and second adhesive strips having an adhesive surface and a non-adhesive surface, said first adhesive strip overlapping said top edge of said back sheet to define a top adhesive area extending outwardly of said top edge of said back sheet, and said second adhesive strip overlapping said bottom edge of said back sheet to define a bottom adhesive area extending outwardly of said bottom edge of said back sheet, with said adhesive surfaces of said first and second adhesive strips contacting said back surface of back sheet;

first and second releasable liner strips substantially coextensive with and adhesively attached to said top and bottom adhesive areas, respectively, at said adhesive surfaces;

a first top sheet having opposed top and bottom edges, opposed side edges, a front surface, and a back surface, said first top sheet being substantially coextensive with said back sheet, said back surface of said first top sheet facing said front surface of said back sheet, and a first line of adhesive adhering said back surface of said first top sheet to said front surface of said back sheet, said first line of adhesive being parallel to and inwardly offset from said top edges of said first top and back sheets, and said first top sheet including a first line of weakness parallel to and downwardly offset from said first line of adhesive; and a second top sheet having opposed top and bottom edges, opposed side edges, a front surface, and a back surface, said second top sheet being substantially coextensive with said first top sheet and said back sheet, said back surface of said second top sheet facing said front surface of said first front sheet, and a second line of adhesive adhering said back surface of said second top sheet to said front surface of said first top sheet, said second line of adhesive being aligned with said first line of adhesive, and said second top sheet including a second line of weakness aligned with said first line of weakness.

2. The business form of claim 1, wherein said top and bottom sheets further include aligned lines of tractor feed holes parallel to said top edges of said top and bottom sheets and intermediate said lines of weakness and said top adhesive strip.

3. The business form of claim 1, wherein said top edges of said top sheets are coextensive with said top edge of said bottom sheet and said bottom edges of said top sheets are inwardly offset from said bottom edge of said bottom sheet.

4. A business form for window mounting comprising:

a back sheet having opposed top and bottom edges, opposed side edges, a front surface, a back surface, and a line of weakness parallel to and below said top edge;

first and second adhesive strips having an adhesive surface and a non-adhesive surface, said first adhesive strip overlapping said top edge of said back sheet to define a top adhesive area extending outwardly of said top edge of said back sheet, and said second adhesive strip overlapping said bottom edge of said back sheet to define a bottom adhesive area extending outwardly of said bottom edge of said back sheet, with said adhesive surfaces of said first and second adhesive strips contacting said back surface of back sheet; and first and second releasable liner strips substantially coextensive with and adhesively attached to said top and bottom adhesive areas, respectively, at said adhesive surfaces.

5. The business form of claim 4, wherein said back sheet further includes a line of tractor feed holes parallel to said top edge, and intermediate said first adhesive strip and said line of weakness.

6. A business form for window mounting comprising:

a back sheet having opposed top and bottom edges, opposed side edges, a front surface, and a back surface;

a top sheet having opposed top and bottom edges, opposed side edges, a front surface, and a back surface, said top sheet being substantially coextensive with said back sheet, said back surface of said top sheet facing said front surface of said back sheet, and a line of adhesive adhering said back surface of said top sheet to said front surface of said back sheet, said line of adhesive being parallel to and inwardly offset from said top edges of said top and back sheets, and said top sheet including a line of weakness parallel to and downwardly offset from said line of adhesive;

first and second adhesive strips having an adhesive surface and a non-adhesive surface, said first adhesive strip overlapping said top edge of said back sheet to define a top adhesive area extending outwardly of said top edge of said back sheet, and said second adhesive strip overlapping said bottom edge of said back sheet to define a bottom adhesive area extending outwardly of said bottom edge of said back sheet, with said adhesive surfaces of said first and second adhesive strips contacting said back surface of back sheet; and first and second releasable liner strips substantially coextensive with and adhesively attached to said top and bottom adhesive areas, respectively, at said adhesive surfaces.

7. The business form of claim 6, wherein said top and back sheets further include aligned lines of tractor feed holes parallel to said top edges of said top and bottom sheets and intermediate said line of weakness and said top adhesive strip.

8. The business form of claim 6, wherein said top edge of said top sheet is coextensive with said top edge of said back sheet and said bottom edge of said top sheet is inwardly offset from said bottom edge of said back sheet.

* * * * *